US006704884B1

(12) United States Patent
Shepherd et al.

(10) Patent No.: US 6,704,884 B1
(45) Date of Patent: Mar. 9, 2004

(54) REPLICATED CONTROL BLOCK HANDLES FOR FAULT-TOLERANT COMPUTER SYSTEMS

(75) Inventors: Adam Paul Shepherd, Enfield (GB); Benjamin Mark Simon Kenneth Miller, London (GB); Colin Michael Dancer, Enfield (GB); Andrew John Tylee, Enfield (GB); Paul John Brittain, Chester (GB); Nicolas Peter Everard Weeds, Chester (GB); David William Maxwell Reekie, Enfield (GB)

(73) Assignee: Adam Shepherd, Enfield (GB)

( * ) Notice: Subject to any disclaimer, the term of this patent is extended or adjusted under 35 U.S.C. 154(b) by 522 days.

(21) Appl. No.: 09/645,403

(22) Filed: Aug. 25, 2000

(51) Int. Cl.[7] .................................................. G06F 11/00
(52) U.S. Cl. ............................................................ 714/4
(58) Field of Search ............................ 714/4, 6, 15, 18, 714/20

(56) References Cited

U.S. PATENT DOCUMENTS

| 5,465,328 A | * | 11/1995 | Dievendorff et al. ......... 714/15 |
| 5,504,883 A | * | 4/1996 | Coverston et al. .......... 707/202 |
| 5,577,240 A | * | 11/1996 | Demers et al. ................ 707/8 |
| 5,621,885 A | | 4/1997 | Del Vigna, Jr. |
| 5,724,500 A | * | 3/1998 | Shinmura et al. .............. 714/6 |
| 5,734,897 A | * | 3/1998 | Banks ........................ 707/202 |
| 5,978,933 A | | 11/1999 | Wyld et al. |
| 6,199,178 B1 | * | 3/2001 | Schneider et al. ............ 714/21 |
| 6,449,733 B1 | * | 9/2002 | Bartlett et al. ................ 714/13 |
| 6,516,314 B1 | * | 2/2003 | Birkler et al. ................. 707/8 |

FOREIGN PATENT DOCUMENTS

| EP | 0409604 A2 | 1/1991 |
| EP | 0590866 A2 | 4/1994 |

* cited by examiner

*Primary Examiner*—Robert Beausoliel
*Assistant Examiner*—Bryce P. Bonzo

(57) ABSTRACT

In a fault-tolerant system employing software fault-tolerance techniques, the identifiers used for control blocks or objects referenced on an interface between two co-operating partner software processes either require resynchronization after fail over of one or both of the partners or impose unwanted performance impacts on normal operation of the system. Replicated handles enhance the techniques currently used in such systems to avoid both the need for resynchronization and other potential performance impacts of the prior art.

12 Claims, 3 Drawing Sheets

Replicated handles in use between processes A and B, each with a backup copy on a separate CPU

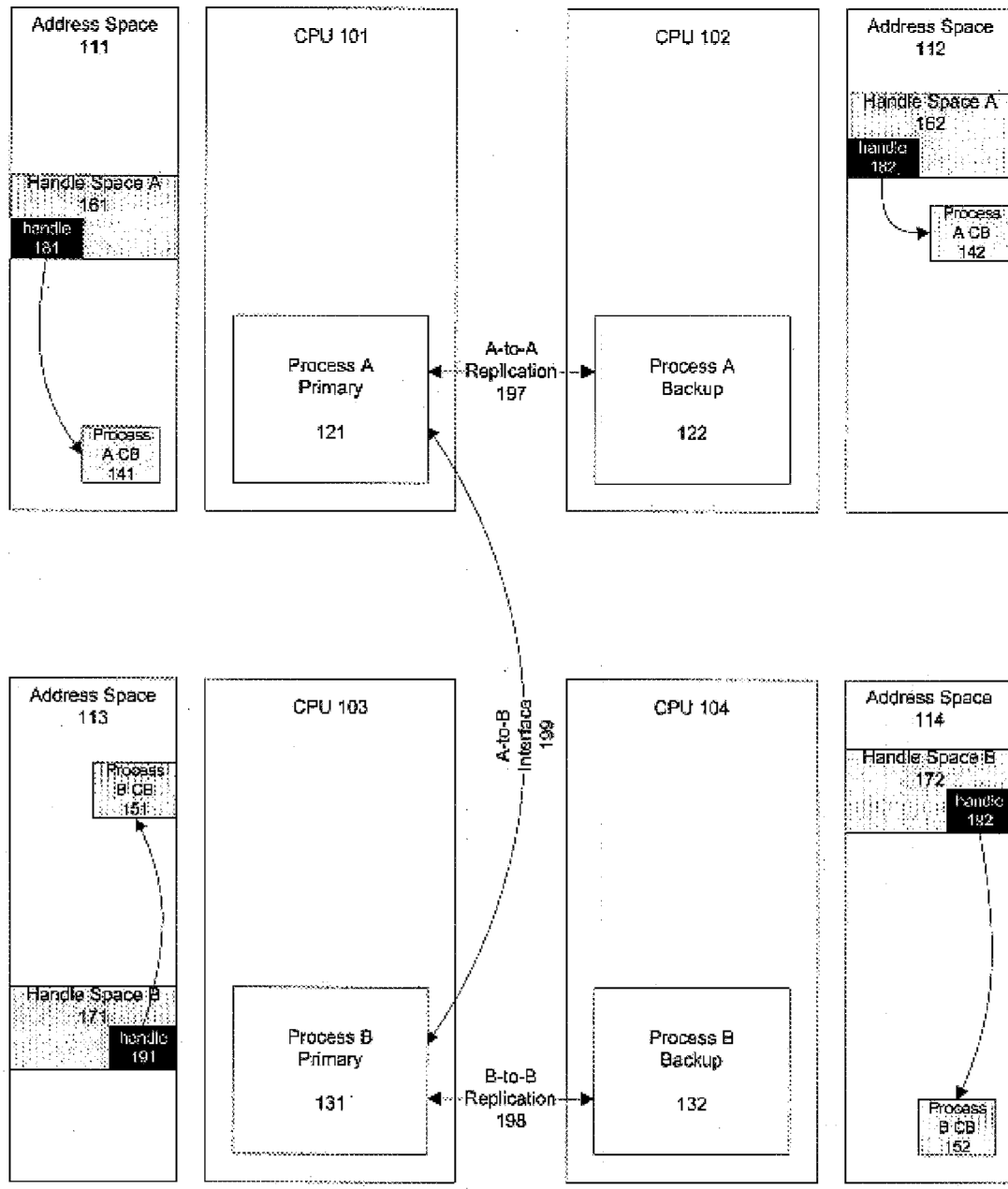
FIG. 1 Replicated handles in use between processes A and B, each with a backup copy on a separate CPU

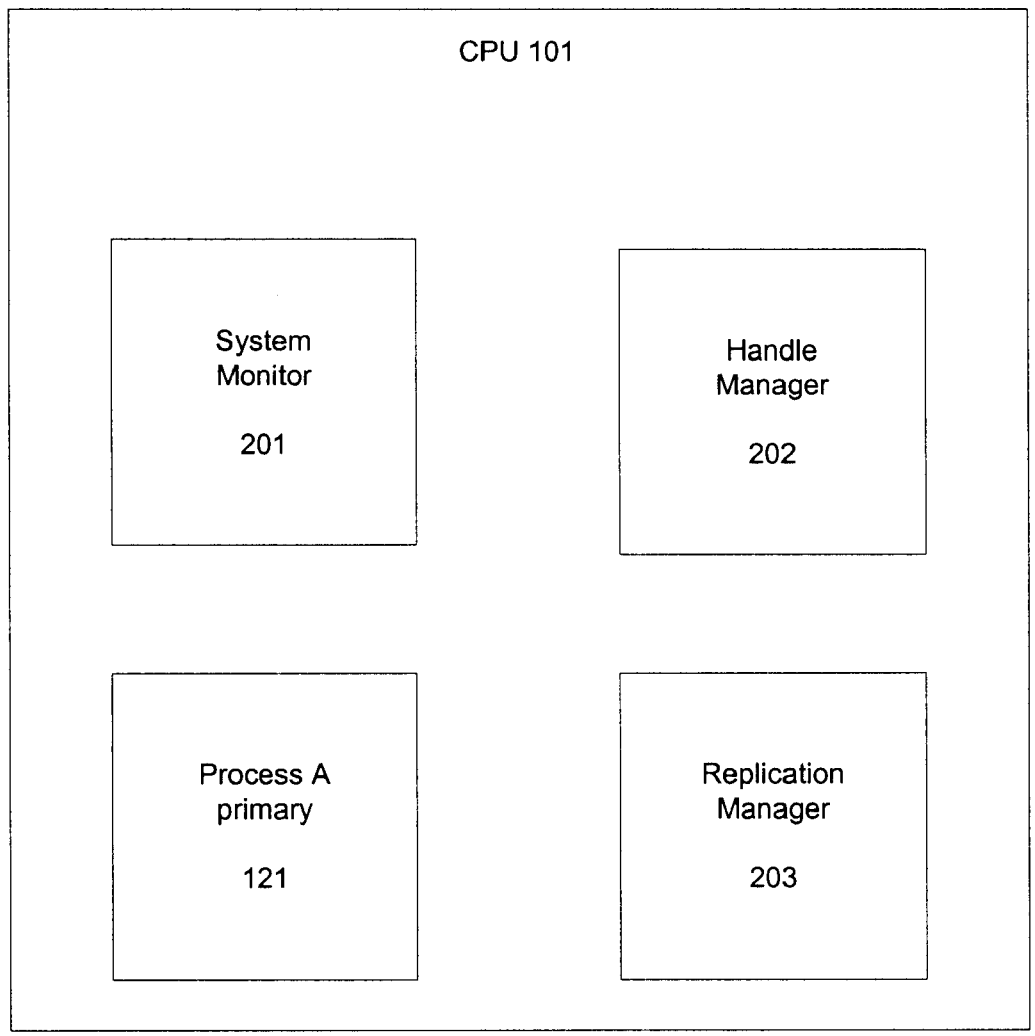
FIG. 2 Components of a replicated handle system

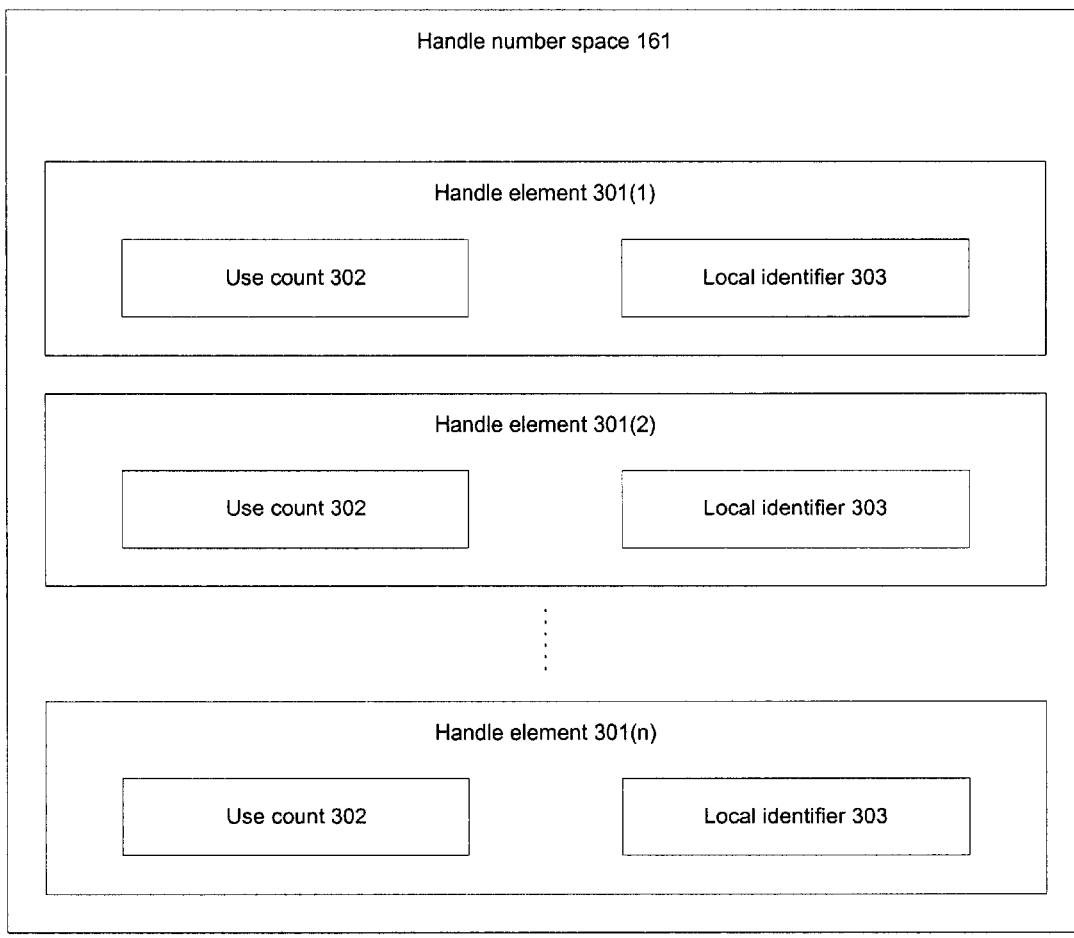
FIG. 3 Handle number space

REPLICATED CONTROL BLOCK HANDLES FOR FAULT-TOLERANT COMPUTER SYSTEMS

BACKGROUND OF THE INVENTION

1. Field of the Invention

The present invention relates to the field of fault-tolerant computer systems. More specifically, the present invention relates to the problem of assigning identifiers to control blocks or other objects used by the software processes that share a common interface when any of these software processes may independently fail over to a redundant backup copy of the software process. Ideally, such identifiers should be the same in primary and backup copies of a software process so that they do not change when a fail over occurs.

2. Description of Prior Art

Fault-tolerant computer systems use a variety of techniques to provide highly-available systems for use in safety-critical or mission-critical environments. Many different approaches have been taken by different organizations to achieve fault-tolerance.

One approach to fault-tolerance is to use specialized hardware and operating systems to mirror all inputs to a number of redundant processing units. Outputs from the system are taken from just one processing unit, called the primary, until it is determined to have failed and another processing unit is selected as the primary. Another approach is to take a majority vote for the correct output, and disabling any processing unit which disagrees with this output on the assumption that it has failed. For further details of this approach to fault-tolerance, see the following U.S. Pat. No. 5,271,013, Gleeson; U.S. Pat. No. 5,363,503, Gleeson; U.S. Pat. No. 5,560,033, Doherty et al.; and U.S. Pat. No. 5,802,265, Bressoud et al.

An alternative approach is to provide fault-tolerance in the software process layer, which avoids the need for specialized hardware or operating system support. This approach is also more easily deployed on a cluster of heterogeneous processing units with different hardware characteristics, since it does not rely on specific attributes of the hardware. Software fault-tolerance, as this approach is commonly called, typically uses a combination of redundant backup software processes and replication of internal state between the primary and backup copies of each software process to speed recovery from any software or hardware faults. However, many practical fault-tolerant systems combine both hardware and software fault tolerance techniques. For further details of the general techniques used to achieve software fault-tolerance, see the following U.S. Pat. No. 5,129,080, Smith; and U.S. Pat. No. 5,748,882, Huang. See also the following publications: Hardware and Software Architectures for Fault Tolerance, Chapter 3, ed. Banatre et al., Springer-Verlag 1994; Fault Tolerance in Distributed Systems, Jalote, Chapter 5, Prentice Hall 1994; and Fault-Tolerant Computer System Design, Chapter 7, Pradhan, Prentice Hall 1996.

Since software fault-tolerance does not have the benefit of hardware assistance, the performance of systems employing software fault-tolerance can be an issue in some environments. In particular, a potential performance bottleneck is the addressing of control blocks or other objects used on an interface between two software processes, known as "partner" software processes, each of which can fail over independently to a backup software process. This situation is further complicated if the backup processes may be running on a different processing unit, possibly employing a different processor architecture. Standard techniques that are commonly used to identify control blocks and objects on software interfaces all suffer from some disadvantages in a distributed, heterogeneous fault-tolerant system.

Use of names for the control blocks necessitates a search of all names on each request, and hence gives poor performance.

Use of memory addresses, or "pointers" as they are commonly known, gives good performance until one partner software process fails over to a backup. After fail over, however, a resynchronization phase between the partner software processes is required in order to exchange replacement addresses as the backup that has taken over as primary may not have allocated the control blocks at the same address as the failed primary. This resynchronization requires the use of some form of name-based search for the control blocks or objects, which is potentially a slow operation. Window conditions in the interface between software processes may also make the direct exchange of a pointer with a partner software process unsafe and prone to cause system failures.

The potential system failures caused by direct use of pointers can be avoided by using a direct index or an indirect index, known as a "handle", taken from an extensible pool of handles. Unfortunately the use of an index or handle still necessitates resynchronization between partner software processes after fail over because there is no guarantee that the index or handle value assigned by the primary and backup copies of a same software process type will match.

BRIEF SUMMARY OF THE INVENTION

The present invention, known as a "replicated handle", is a means of identifying control blocks or objects on an interface between partner software processes in a software fault-tolerant system. Replicated handles make use of a close coupling between the functions of a pool manager for indirect index values and the replication of internal state information between primary and backup copies of a software process. This allows handles to be replicated either by piggybacking the exchanges used to replicate internal state between primary and backup copies of a software process, or as an explicit action when required.

The present invention has the following advantages over prior art:

The present invention allows partner software processes to exchange identifiers for control blocks or objects with a guarantee that the identifiers do not change when one or more of the partners fails over to a redundant backup copy, and preserving efficient access to the control blocks or objects within each software process. The fact that the identifiers used for the control blocks or objects do not change avoids the need for resynchronization of these identifiers after a fail over.

The present invention achieves the replication of handles without requiring any additional message exchanges between primary and backup copies of a software process by piggybacking on the replication of internal state that is required for software fault-tolerance.

The present invention allows the number of replicated handles available to a software process to be extended dynamically in order to cope with variations in the work load presented to the system.

The present invention is independent of the system hardware architecture or operating system, and can be used in heterogeneous distributed systems.

BRIEF DESCRIPTION OF THE DRAWINGS

FIG. 1 shows the use of replicated handles on an interface between two software processes, each with a primary and backup copy running on separate processing units.

FIG. 2 is a simplified block diagram of the functional elements of a system that uses replicated handles.

FIG. 3 is a diagram of the structure of the preferred embodiment of a handle number space.

REFERENCE NUMERALS IN THE DRAWINGS

System Components:
- 101: A processing unit (abbreviated to CPU on the drawings)
- 102: A processing unit
- 103: A processing unit
- 104: A processing unit
- 111: A simplified representation of the memory address space used by CPU 101
- 112: A simplified representation of the memory address space used by CPU 102
- 113: A simplified representation of the memory address space used by CPU 103
- 114: A simplified representation of the memory address space used by CPU 104
- 121: The copy of process A running on CPU 101. This copy is currently the primary copy of A.
- 122: The copy of process A running on CPU 102. This copy is currently the backup copy of A.
- 131: The copy of process B running on CPU 103. This copy is currently the primary copy of B.
- 132: The copy of process B running on CPU 104. This copy is currently the backup copy of B.
- 141: The control block used by process 121 to maintain the Process A state for the communication between processes A and B.
- 142: The control block used by process 122 to maintain the Process A state for the communication between processes A and B.
- 151: The control block used by process 131 to maintain the Process B state for the communication between processes A and B.
- 152: The control block used by process 132 to maintain the Process B state for the communication between processes A and B.
- 161: The copy of the handle number space for process A on CPU 101.
- 162: The copy of the handle number space for process A on CPU 102.
- 171: The copy of the handle number space for process B on CPU 103.
- 172: The copy of the handle number space for process B on CPU 104.
- 181: The copy of the process A handle for control block 141 used by process 121.
- 182: The copy of the process A handle for control block 142 used by process 122.
- 191: The copy of the process B handle for control block 151 used by process 131.
- 192: The copy of the process B handle for control block 152 used by process 132.
- 201: System monitor function.
- 202: Handle manager function.
- 203: Replication manager function.
- 301: Handle element within a handle number space
- 302: The use count associated with a handle element
- 303: The local identifier associated with a handle element.

Message Flows:
- 197: Replication of internal state information between primary and backup copies of process A.
- 198: Replication of internal state information between primary and backup copies of process B.
- 199: The interface between processes A and B.

DETAILED DESCRIPTION OF THE INVENTION

This description covers a method for addressing control blocks and objects referenced on an interface between two partner software processes in a fault-tolerant system. In the description, there are set forth, for purposes of explanation, many specific details, to provide the reader with a thorough understanding of the invention. It will be obvious to one skilled in the art that the invention may be practiced without these details. Furthermore, certain devices and orders of processing are given in the diagrams and the description, to make understanding the invention easier. It will, again, be apparent to one skilled in the art that the specific devices and sequences are merely illustrative and may be varied whilst remaining within the spirit and scope of the present invention.

Description of the Preferred Embodiment

What follows is a description of the preferred embodiment of the present invention. Other possible embodiments will be discussed later.

Components of a System That Supports Replicated Handles

With reference to FIG. 2, the preferred embodiment of a system that supports replicated handles consists of the following components:

- A plurality of processing units of which only one, CPU 101, is shown in FIG. 2.
- A plurality of software process types that use replicated handles to identify their control blocks and objects. FIG.2 shows the primary copy of one such software process type, process A Primary 121. Backup copies of each software process type may run on the same CPU, 101, or a plurality of processing units in the system.
  Note that the concept of a process type is used in this document to include logically distinct instances of a piece of software, such as "Protocol X running on interface A" and "Protocol X running on interface B", as well as functional distinctions such as "Protocol X" or "Protocol Y". The primary and backup copies of "Protocol X running on interface A" represent copies of the same process type.
- The system monitor, 201, is a specific software process type which is responsible for assigning primary or backup roles to each copy of a software process type, such as 121. In the preferred embodiment of the present invention, a copy of the System Monitor, 201, executes each of a plurality of processing units in the system.

The handle manager, 202, controls the allocation and use of replicated handles. Each replicated handle is assigned from a handle number space that is associated with the software process type. In the preferred embodiment of the present invention, the handle manager, 202, controls a plurality of handle number spaces on behalf of a plurality of software process types. The handle manager maintains a separate copy of the handle number space for a software process type for each copy of that software process type, such as 121, that it serves.

The replication manager, 203, is responsible for replicating internal state information between primary and backup copies of a software process type, such as 121 and 122. In the preferred embodiment of the present invention, the replication manager replicates state from the primary copy of a software process type to a plurality of backup copies of the software process type. Replication may be incremental or by bulk transfer of state information. In the preferred embodiment of the present invention, bulk replication is used when a new backup copy of the software process type first synchronizes with the primary copy or after a failure in incremental replication to a given backup copy. Once the bulk replication is completed, incremental replication is used thereafter until the next failure of incremental replication.

Primitive Operations on Replicated Handles

With reference to FIG. 3, the preferred embodiment of the present invention supports five primitive operations on replicated handles:

The "allocate" operation on a replicated handle assigns a handle value for use and optionally associates a local identifier to that handle value. The local identifier is assigned by the software process allocating the replicated handle, and is usually the local memory address of a control block or object. This operation on a replicated handle can only be performed by the primary copy of a software process type.

The preferred embodiment of the present invention allocates handles from a handle number space, 161, consisting of a number of handle elements, 301(l) . . . 301(n). Each handle element stores a local identifier value, 303, and a use count, 302. The handle value returned by an allocation operation is a combination of the index of the handle element, 301, allocated to the handle within the handle number space, 300, and the use count, 302, in the assigned handle element, 301. The use count, 302, is incremented each time a handle element, 301, is reused, which prevents immediate re-allocation of the same handle value even if the same handle element, 301, is immediately re-used.

The "validate" operation on a handle takes the value of a handle and returns the local identifier associated with the handle. The preferred embodiment of the present invention also validates the use count embedded in the handle value. If the handle use count, 302, does not match the value embedded in the handle value, the handle is returned as invalid. This enables a software process using replicated handles to more easily survive errors introduced by window conditions in the interfaces it shares with other software processes that cause an handle value to be passed back from a partner software process that is no longer in use.

The "destroy" operation on a handle frees a replicated handle for re-use. In the preferred embodiment of the present invention, the handle element, 301, used by the destroyed handle value is added to the list of free handle elements only if the handle use count, 302, matches that embedded in the handle value.

Replication of a replicated handle is achieved by replicating the internal state information required to create or update the control block or object that caused a new handle value to be assigned by the primary copy of a software process type along with the handle value assigned to the new control block.

When a backup copy of a software process type receives this information, it allocates the same handle value using the "replicated allocation" operation which allows it to force the use of a specific handle element, 301, and use count, 302. The backup copy of the software process type using the replicated handle assigns the local identifier, 303, associated with the handle value. This local identifier, 303, need not be the same as that used by the primary copy of the software process type. This operation on a replicated handle can only be performed by a backup copy of a software process type.

This operation on a replicated handle is performed by a backup copy of a software process type when it receives the replicated handle assigned to a control block or object by the primary copy. In the preferred embodiment of the present invention, the handle assigned by the primary is piggybacked on the messages used to replicate the control block or object from primary to backup and hence is performed when the backup first creates the replicated control block or object. Alternative embodiments may separate these events and allow assignment of one or more replicated handles to a control block or object after the initial creation and replication of the control block or object.

The "reset" operation on the handle number space, 300, associated with a copy of a software process type frees all handle elements, 301, within that handle number space. This operation is used by a backup copy of a software process type when it is informed by the primary copy that it must restart replication of internal state between the primary and backup, because of some previous failure in the replication of internal state.

Use of Replicated Handle Operations

FIG. 1 shows two partner software processes running on four CPUs in a distributed system. A primary copy of process A, 121, is running on CPU 101 and a backup copy, 122, is running on CPU 102. A primary copy of process B, 131, is running on CPU 103 and a backup copy, 132, is running on CPU 104. The memory address space, 111, of CPU 101 is shown alongside 101, and similarly for the memory address spaces 112, 113 and 114 alongside 102, 103 and 104 respectively. 121 replicates internal state information for process A to 122 across the A-to-A replication interface, 197. 131 replicates internal state information for process B to 132 across the B-to-B replication interface, 198. The interface between process A and process B, 199, is active between the primary copies of these processes, 121 and 131.

A replicated handle is used by each copy of process A and process B for access to the copy of a control block for the A-to-B interface, 199, that is local to that copy of each software process type. When 121 allocates the control block it will use for traffic on 199, it first allocates the control block itself, 141. It then allocates a handle, 181, from the copy of the handle number space for process A, 161, associated with 121, assigning the local identifier for that handle to be the memory address of 141. It then replicates the state information needed to assign the control block to 122 across 197. On receipt of the replicated control block information, 122 allocates its own copy of the control block, 142. It then allocates to this control block the same handle value, denoted by the similar positioning of 182 within the copy of the handle number space for process A, 162, associated with 122. If use counts, 302, are used to form part of the handle value, 122 uses the replicated allocation operation to force the use count in handle 182 to be the same as that in 181. However, 122 assigns the local identifier for 162 to the memory address of 142.

The location of 161 and 162 within the address space of each CPU (111 and 112 respectively) need not be the same, as shown in FIG. 1. Also, 141 and 142 need not be at the same memory address in 111 and 112 respectively. However, the handle value, made up of the handle index, 301, and use count, 302, used by 121 and 122 is the same and is independent of the hardware capabilities and processing load on 101 and 102.

Similarly, 131 and 132 allocate the same handle value within the handle number space for process B to their control blocks, 151 and 152 respectively. These handle values are taken from the handle number space for process B, which is independent of the handle number space of process A. Handles 191 and 192 are assigned the memory address of 151 and 152 respectively as the local identifier value.

If the primary copy of process A, 121, fails and the backup copy of process A, 122, takes over as the primary, the handle values exposed by process A on the A-to-B interface, 199, do not change. However, the local identifier (memory address) associated with each handle value used by the new primary copy of process A, 121, need not be the same as the value used by the previous primary copy of process A, 121. Similarly, if the primary copy of process B, 131, fails over to the backup copy, 132, the handle values used by process B on the A-to-B interface, 199, do not change. This also holds true if fail over of process A and process B occur simultaneously.

Description of Alternative Embodiments

What follows is a description of some alternative embodiments of the present invention. One skilled in the art will easily be able to envisage other alternative embodiments of the invention.

It should be noted that the section titled "Detailed Description of the Invention" is simply a description of the preferred and some additional embodiments of the invention; the full scope of the invention is determined by the claims. A systems engineer skilled in the art of developing fault-tolerant distributed computing systems, based on the claims and the detailed description, should be able to implement a wide variety of replicated handle systems significantly advanced compared with the current state of the art.

Distribution of System Components

The components of the preferred embodiment of the present invention can be instantiated in different forms according to the requirements and capabilities of the hardware and operating system. Some alternative embodiments include the following variations:

The software processes that use replicated handles may communicate with the system monitor, handle manager and replication manager by means of function calls or message exchanges. The communication method chosen for each of these interactions may be different.

The handle manager may control the handle number space for a single process copy, a plurality of copies of the same software process type, or a plurality of process copies of a plurality of different process types.

The system monitor, handle manager or replication manager may be incorporated into the operating system provided on the system, or they may be provided as standalone software processes, or they may be incorporated into each copy of a software process type. The method of instantiation each of these components may be different, and may vary for different processing units within a distributed system or for different software process types.

All components of the system may be instantiated on all processing units within a distributed fault-tolerant system, or some subset of the processing units that make up the distributed system. Each component may be instantiated on a different set of processing units. All processing units may be of a single type, or each processing unit may be one of a plurality of different types.

Assignment and Sizing of Handle Number Spaces

Some alternative embodiments of the present invention may assign the handle number spaces associated with a software process type statically at compilation time, dynamically according to configuration information, or dynamically on demand as they are required to service replicated handle requests from software processes. The size of a handle number space may be pre-determined or dynamically varied according to the requirements of the software processes that use a handle number space.

Choice of Local Identifier

In the preferred embodiment of the present invention, the memory address of a control block or object is used as the local identifier associated with a handle value. Some alternative embodiments may use any other value of that is convenient for a software process type as the local identifier associated with a handle value. The nature of the local identifier may be different for each software process type.

Replication

Some alternative embodiments of the present invention may replicate internal state, including replicated handle values, between primary and backup copies of a software process type by means of message exchanges between the copies or use of shared memory or other shared storage media.

Replication may be achieved by bulk transfer of the entire internal state or incremental replication of changes to the internal state of the primary copy of a software process type.

Replication of internal state may be synchronous or asynchronous with state changes on the primary copy of a software process type.

The assignment of replicated handles may occur when a control block or object is first created or at any subsequent point in the lifetime of the control block or object. The replication of the handle may be piggybacked on the replication of the control block or object to the backup, or it may use a separate replication mechanism.

Number of Handles

A control block or object may have a plurality of replicated handles associated with it at once. Alternatively, some embodiments may allow only one handle to be associated with a control block or object at once but allow the handle to be changed during the lifetime of the control block of object.

Backup Strategy

Some alternative embodiments of the present invention may employ zero, one or a plurality of backup copies of a software process type. The number of copies of a software process type may be statically assigned, dynamically set at start of day according to configuration information, or dynamically adjusted while the system is running according to configuration changes, the capabilities of the system and the work load presented to the system.

Some alternative embodiments may also use cut-down versions of the software process as a backup that, for example, can store the state data and handles replicated to them from the primary but cannot take over as the primary copy. Such backups can be used to store the state of a software process type until the system monitor is able to start a new full copy of the process that then synchronizes with the saved internal state before taking over as primary.

We claim:

1. A method for ensuring that the identifiers exchanged over an interface between partner software processes for the control blocks or objects used by said partner software processes have the same value in the primary copy and backup copies of said partner software processes executing on one or a plurality of processing units, said method comprising of the steps of
   a. assigning said identifiers, known as handle values, from a plurality of handle number spaces associated with a process type of said partner process
   b. allowing only said primary copy of said process types to assign said handle values from said handle number spaces
   c. first means of replicating said handle value for each said control block or object when the internal state of said primary copy, including said control block or object, is replicated from said primary copy to one or a plurality of backup copies of said process type
   d. coercing the handle value chosen by said backup copies of said process type to be the same as said handle value chosen by said primary copy
   e. second means of replicating destruction of said handle value when said primary copy no longer requires said handle for said control block or object
   f. resetting said handle number space used by a backup copy of said process type when said backup copy starts or after recovery from a previous failure of said replication of said handle values to said backup copy.

2. The method as set forth is claim 1, further comprising the step of associating a local identifier with said handle value, said step comprising the steps of
   a. allowing said primary copy and said backup copies of said process type to register said local identifiers for said handle value, said local identifiers being independently assigned by said primary copy and each of said backup copies and stored in memory or other storage media
   b. allowing said primary copy and said backup copies to retrieve said local identifiers from said memory using said handle value to query the database of said local identifiers.

3. The method as set forth in claim 2, with a further step of ensuring that said handle value is not immediately reused after said handle value is destroyed by said primary copy.

4. The method as set forth in claim 3, wherein immediate reuse is prevented by means of forming part of said handle value from a use count, said use count being updated each time the other parts of said handle value are reused.

5. The method as set forth in claim 3, wherein immediate reuse is prevented by means of assigning said handle values from said handle number space on a least-recently-used basis.

6. The method as set forth in claim 5, wherein immediate reuse is further prevented by means of forming part of said handle value from a use count, said use count being updated each time the other parts of said handle value are reused.

7. The method as set forth in claim 3, wherein uniqueness of said handle value is guaranteed by a further step of assigning said handle number spaces to a unique said process type from within a group comprising a plurality of said process types such that said handle values are guaranteed to be unique across said group.

8. The method as set forth in claim 7, wherein said first means and said second means are achieved by message exchanges between said primary copy and said backup copies.

9. The method as set forth in claim 7, wherein said first means and said second means are achieved by use of shared memory or other shared storage media accessible to said primary copy and said backup copies.

10. The method as set forth in claim 2, with a further step of assigning said handle number spaces to a unique said process type from within a group comprising a plurality of said process types such that said handle values are guaranteed to be unique across said group.

11. The method as set forth in claim 2, wherein said first means and said second means are achieved by message exchanges between said primary copy and said backup copies.

12. The method as set forth in claim 2, wherein said first means and said second means are achieved by use of shared memory or other shared storage media accessible to said primary copy and said backup copies.

* * * * *